US012401119B2

(12) United States Patent
Toyao et al.

(10) Patent No.: US 12,401,119 B2
(45) Date of Patent: Aug. 26, 2025

(54) MULTIBAND ANTENNA

(71) Applicant: Japan Aviation Electronics Industry, Limited, Tokyo (JP)

(72) Inventors: Hiroshi Toyao, Tokyo (JP); Kenta Tsuchiya, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 300 days.

(21) Appl. No.: 18/127,176

(22) Filed: Mar. 28, 2023

(65) Prior Publication Data

US 2023/0335901 A1 Oct. 19, 2023

(30) Foreign Application Priority Data

Apr. 18, 2022 (JP) ................................. 2022-068160

(51) Int. Cl.

*H01Q 5/307* (2015.01)
*H01Q 1/38* (2006.01)
*H01Q 1/48* (2006.01)
*H01Q 5/378* (2015.01)
*H01Q 13/10* (2006.01)

(52) U.S. Cl.

CPC ............... *H01Q 5/307* (2015.01); *H01Q 1/48* (2013.01); *H01Q 13/106* (2013.01)

(58) Field of Classification Search

CPC .......... H01Q 1/243; H01Q 13/10; H01Q 1/48; H01Q 5/371; H01Q 1/38; H01Q 5/378; H01Q 9/0421; H01Q 9/42; H01Q 5/364; H01Q 13/106; H01Q 21/28; H01Q 5/35; H01Q 9/0407

See application file for complete search history.

(56) References Cited

U.S. PATENT DOCUMENTS

| | | | | |
|---|---|---|---|---|
| 9,225,053 | B2 | 12/2015 | Hung et al. | |
| 11,349,219 | B2 | 5/2022 | Toyao et al. | |
| 2008/0316115 | A1* | 12/2008 | Hill | H01Q 9/0407 343/702 |

(Continued)

FOREIGN PATENT DOCUMENTS

| | | | |
|---|---|---|---|
| CN | 102790262 | A | 11/2012 |
| JP | 2012-085262 | A | 4/2012 |
| JP | 2021-136527 | A | 9/2021 |

OTHER PUBLICATIONS

Extended European Search Report of European Application No. 23 165 262.9 dated Sep. 18, 2023.

*Primary Examiner* — Wei (Victor) Y Chan
(74) *Attorney, Agent, or Firm* — Collard & Roe, P.C.

(57) ABSTRACT

First and second slot edge portions of a conductive main portion are long in a first direction and sandwich a slot in a second direction. An open portion is formed a part different from the first slot edge portion and opens the slot outside the conductive main portion. A first part of a radiation element extends from an end portion of the first slot edge portion in the second direction. A second part of the radiation element extends from an end portion of the first part in the first direction. An additional element extends from the second part toward a second specific area through a first specific area. In a third direction, the first specific area and the second specific area overlap with the first slot edge portion and the second slot edge portion, respectively.

6 Claims, 9 Drawing Sheets

(56) References Cited

U.S. PATENT DOCUMENTS

| | | | | |
|---|---|---|---|---|
| 2008/0316117 | A1* | 12/2008 | Hill | H01Q 13/10 343/702 |
| 2009/0153410 | A1* | 6/2009 | Chiang | H01Q 13/10 343/702 |
| 2021/0126373 | A1 | 4/2021 | Kosaka | |

* cited by examiner

MULTIBAND ANTENNA

CROSS REFERENCE TO RELATED APPLICATIONS

This application is based on and claims priority under 35 U.S.C. § 119 to Japanese Patent Application No. JP2022-068160 filed Apr. 18, 2022, the contents of which are incorporated herein in their entirety by reference.

BACKGROUND OF THE INVENTION

This invention relates to a multiband antenna, particularly, to a multiband antenna provided with a slot antenna and a radiation element.

Referring to FIG. 17, a multiband antenna 90 disclosed in JP 2021-136527A (Patent Document 1) is provided with a slot antenna 92 and a radiation element 94.

As shown in FIG. 17, a slot 921 of the slot antenna 92 has a longitudinal direction in a first direction or a Y-direction. The radiation element 94 has a first part 941 and a second part 943. The first part 941 extends from the slot antenna 92 in a second direction or an X-direction perpendicular to the first direction. The second part 943 extends from an end portion of the first part 941 in the first direction. The second part 943 is larger than the first part 941 in length.

The multiband antenna 90 of Patent Document 1 has two resonant frequencies or operating frequencies, namely, a resonant frequency of the slot antenna 92 and a resonant frequency of the radiation element 94. Here, the second part 943 of the radiation element 94 extends in the first direction and lowers the resonant frequency of the slot antenna 92 in comparison with a case where the radiation element 94 is not provided. This means that the use of the radiation element 94 can cause downsizing of the slot antenna 90 which has a specific resonant frequency.

SUMMARY OF THE INVENTION

It is an object of the present invention to provide a multiband antenna which can be downsized by adopting a structure different from that of the multiband antenna of Patent Document 1.

One aspect of the present invention provides a multiband antenna which comprises a conductive main portion forming a slot antenna, a radiation element and an additional element. The conductive main portion comprises a first slot edge portion and a second slot edge portion. The conductive main portion is formed with a slot and an open portion. The slot has a longitudinal direction in a first direction. Each of the first slot edge portion and the second slot edge portion has a longitudinal direction in the first direction. The first slot edge portion and the second slot edge portion are arranged so that the first slot edge portion and the second slot edge portion sandwich the slot therebetween in a second direction perpendicular to the first direction. The open portion is formed at a part of the conductive main portion which is different from the first slot edge portion and opens the slot outside of the conductive main portion. The radiation element has a first part and a second part. The first part extends from an end portion of the first slot edge portion in the second direction. The second part extends from an end portion of the first part in the first direction. The additional element extends from the second part to or toward a second specific area through a first specific area without being brought into contact with the conductive main portion. The first specific area is an area which overlaps with the first slot edge portion in a third direction perpendicular to both the first direction and the second direction. The second specific area is an area which overlaps with the second slot edge portion in the third direction.

In the multiband antenna of the present invention, the additional element adjusts an impedance of the multiband antenna, and thereby a resonant frequency of the slot antenna can be lowered. In other words, the additional element can downsize the slot antenna having a specific resonant frequency, so that the multiband antenna can be downsized.

An appreciation of the objectives of the present invention and a more complete understanding of its structure may be had by studying the following description of the preferred embodiment and by referring to the accompanying drawings.

Figure 1:
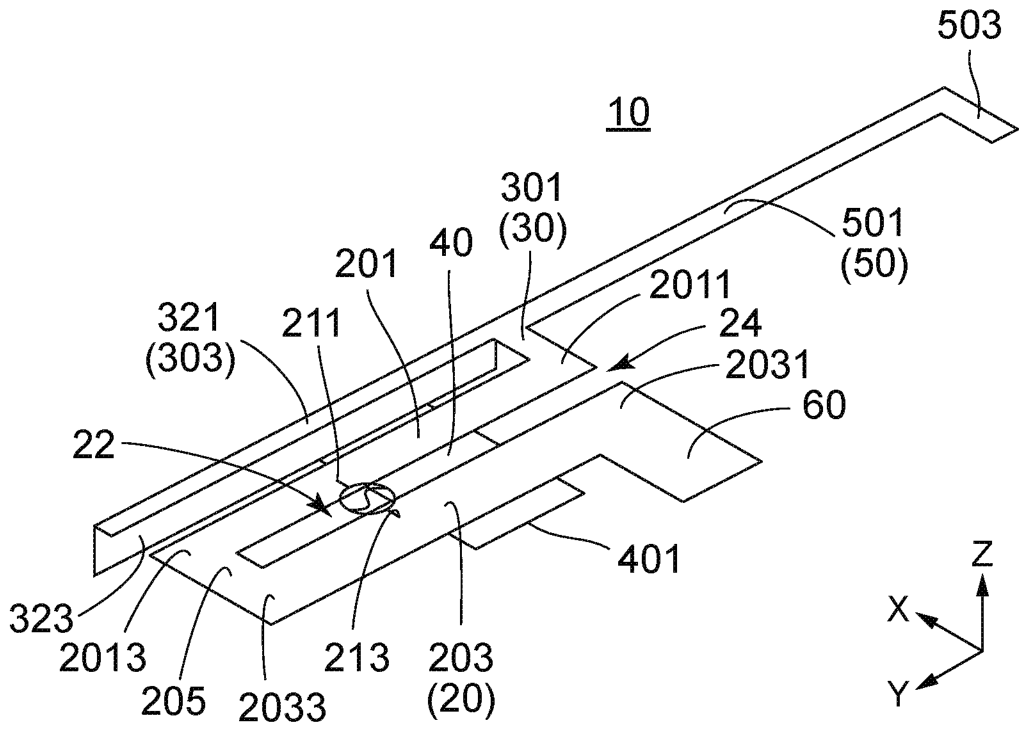
FIG. 1 is a perspective view showing a multiband antenna according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, a multiband antenna 10 according to an embodiment of the present invention is provided with a conductive main portion 20, a first radiation element (radiation element) 30 and an additional element 40. In the present embodiment, the multiband antenna 10 is further provided with a second radiation element (additional radiation element) 50 and a grounding terminal 60. However, in the present invention, the second radiation element 50 and the grounding terminal 60 are not essential. Nevertheless, by providing the second radiation element 50, a bandwidth of the multiband antenna 10 can be widened.

As understood from FIG. 1, the multiband antenna 10 is formed of a single sheet metal. In other words, the multiband antenna 10 is formed by punching and bending a single metal sheet. However, the present invention is not limited thereto. The multiband antenna 10 may be formed of a plurality of metal sheets. Alternatively, the multiband antenna 10 may be formed of a metal foil or a conductive pattern formed on a circuit board instead of the metal sheet at least in part. Furthermore, the multiband antenna 10 may be formed of a metal sheet or a metal foil and a supporter which is made of resin and supports the metal sheet or the metal foil if necessary.

As shown in FIG. 1, the conductive main portion 20 has at least a first slot edge portion 201 and a second slot edge portion 203. In the present embodiment, the conductive main portion 20 further has a coupling portion 205. The first slot edge portion 201, the second slot edge portion 203 and the coupling portion 205 are coupled to one another and define a slot 22 and an open portion 24. In other words, the conductive main portion 20 is formed with the slot 22 and the open portion 24.

As understood from FIG. 1, the conductive main portion 20 is located on a specific plane defined by a first direction and a second direction perpendicular to the first direction. In the present embodiment, the first direction is a Y-direction, and the second direction is an X-direction. Moreover, in the present embodiment, the specific plane is an X-Y plane. The first direction defines a first orientation and a second orientation which is an orientation opposite to the first orientation. In the present embodiment, the first orientation is a negative Y-direction, and the second orientation is a positive Y-direction. Moreover, in the present embodiment, the second direction is also a front-rear direction. A negative X-direction is directed forward while a positive X-direction is directed rearward.

As shown in FIG. 1, each of the first slot edge portion 201 and the second slot edge portion 203 has a rectangular shape long in a first direction. The first slot edge portion 201 has an end portion 2011, which is oriented in the first orientation of the first direction, and an end portion 2013, which is oriented in the second orientation of the first direction. The second slot edge portion 203 has an end portion 2031, which is oriented in the first orientation of the first direction, and an end portion 2033, which is oriented in the second orientation of the first direction.

As shown in FIG. 1, the first slot edge portion 201 and the second slot edge portion 203 are positioned apart from each other in the second direction. The first slot edge portion 201 is located forward of the second slot edge portion 203. In the second direction, the slot 22 and the open portion 24 are located between the first slot edge portion 201 and the second slot edge portion 203. Thus, the first slot edge portion 201 and the second slot edge portion 203 are arranged so that they sandwich the slot 22 and the open portion 24 therebetween.

As shown in FIG. 1, the coupling portion 205 has a rectangular shape long in the second direction. The coupling portion 205 couples one of the end portions of the first slot edge portion 201 to one of the end portions of the second slot edge portion 203. In the present embodiment, the coupling portion 205 couples the end portion 2013 of the first slot edge portion 201 and the end portion 2033 of the second slot edge portion 203 to each other.

As shown in FIG. 1, the slot 22 has a longitudinal direction in the first direction. The open portion 24 is located at an end portion of the conductive main portion 20, wherein the end portion of the conductive main portion 20 is oriented in the first orientation. In other words, the open portion 24 is located between the end portion 2011 of the first slot edge portion 201 and the end portion 2031 of the second slot edge portion 203. The open portion 24 is contiguous to the slot 22 and opens the slot 22 outside of the conductive main portion 20. In the present embodiment, the open portion 24 is opened in the first orientation of the first direction. However, the present invention is not limited thereto. The open portion 24 may be opened forward or rearward. Even when the open portion 24 is opened forward or rearward, the open portion 24 of the present invention is formed at a part of the conductive main portion which is different from the first slot edge portion 201.

As shown in FIG. 1, the first radiation element 30 has a first part 301 and a second part 303. The first part 301 has a rectangular shape long in the second direction and is located on a specific plane. The first part 301 extends in the second direction from the end portion 2011 of the first slot edge portion 201, wherein the end portion 2011 is oriented in the first orientation of the first direction. In the present embodiment, the first part 301 extends rearward.

As shown in FIG. 1, the second part 303 of the first radiation element 30 extends from a rear end portion of the first part 301 in the second orientation of the first direction. In the present embodiment, the second part 303 has an upper portion 321 and a rear portion 323. The upper portion 321 has a rectangular shape long in the first direction and is located on the specific plane. The rear portion 323 has a rectangular shape long in the first direction and extends from a rear edge of the upper portion 321 in a third direction perpendicular to both the first direction and the second direction. In the present invention, the rear portion 323 is not essential. However, the rear portion 323 can increase a radiation efficiency of the first radiation element 30 without increasing an occupation area of the first radiation element 30 when viewed along the third direction. In the present embodiment, the third direction is a Z-direction. Supposing a positive Z-direction is directed upward while a negative Z-direction is directed downward, the rear portion 323 extends downward from the upper portion 321.

As shown in FIG. 1, the additional element 40 extends forward from a lower edge of the rear portion 323 of the second part 303 of the first radiation element 30. The additional element 40 is positioned apart from the conductive main portion 20 in the third direction and extends forward without being brought into contact with the conductive main portion 20.

Figure 2:
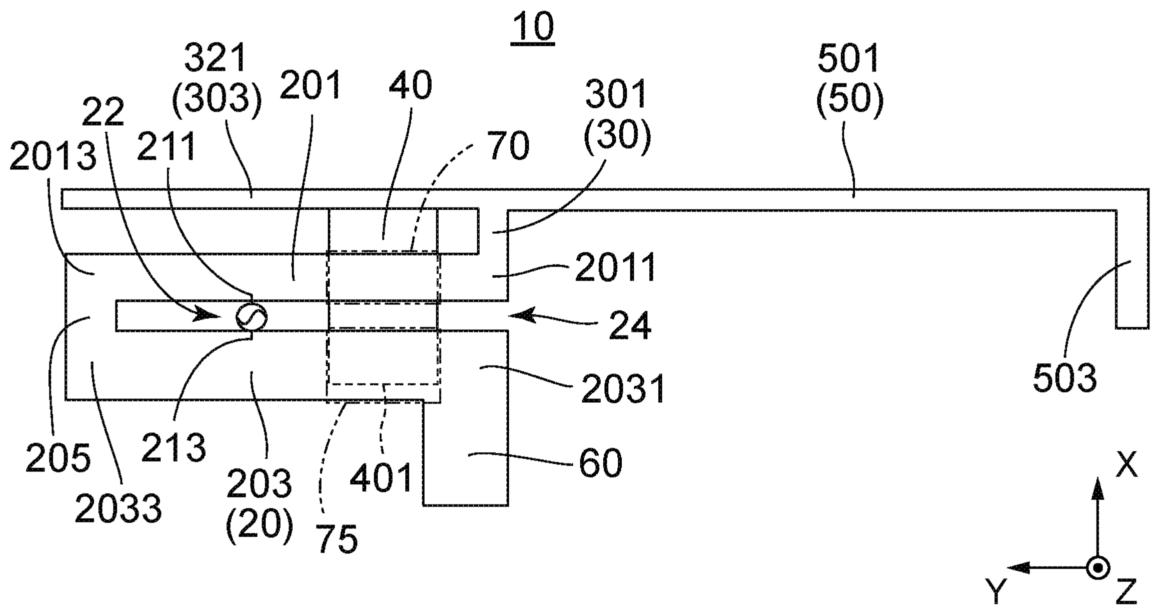
FIG. 2 is a top view showing the multiband antenna of FIG. 1. An additional element is depicted by a broken line in part. Each of a first specific area and a second specific area is depicted by a chain double-dushed line.

Referring to FIG. 2, in the present embodiment, the additional element 40 has a rectangular shape. The additional element 40 is positioned apart from both ends of the second part 303 in the first direction. Moreover, the additional element 40 is nearer to an end portion of the second part 303, which is oriented in the second orientation, than to an end portion of the second part 303, which is oriented in the first orientation, in the first direction. However, the present invention is not limited thereto. The shape and the position of the additional element 40 may be freely set according to intended antenna properties.

As understood from FIG. 2, the additional element 40 extends toward a second specific area 75 through a first specific area 70. In the present embodiment, the additional element 40 extends to the second specific area 75. In other words, the additional element 40 overlaps with the second slot edge portion 203 when viewed along the third direction. Here, each of the first specific area 70 and the second specific area 75 is an area on a plane which is perpendicular to the third direction and which is positioned apart from the specific plane in the third direction. In addition, the first specific area 70 is an area overlapping with the first slot edge portion 201 in the third direction. Moreover, the second specific area 75 is an area overlapping with the second slot edge portion 203 in the third direction. In the present embodiment, the additional element 40 is located on a plane in which the first specific area 70 and the second specific area 75 are included, and a front edge 401 of the additional element 40 is in the second specific area 75. However, the present invention is not limited thereto. Each of the first specific area 70 and the second specific area 75 may be freely set according to intended antenna properties.

As understood from FIGS. 1 and 2, the front edge 401 of the additional element 40 is located near to the second slot edge portion 203. With this structure, a capacitor is formed between the additional element 40 and the second slot edge portion 203. By setting a shape and a size of the additional element 40 to give an intended value to a capacitance, an impedance of the multiband antenna 10 can be adjusted, and downsizing of the multiband antenna 10 can be achieved. Although the additional element 40 extends to the second specific area 75 in the present embodiment, the additional element 40 may not extend to the second specific area 75. However, if an area where the additional element 40 and the second slot edge portion 203 overlap with each other is larger when viewed along the third direction, larger capacitance can be obtained. Larger capacitance can achieve a lower operating frequency and downsize the multiband antenna 10.

As shown in FIGS. 1 and 2, the second radiation element 50 is located on the specific plane and extends from the first radiation element 30 in the first orientation. In detail, the second radiation element 50 has a long portion 501 and a short portion 503. The long portion 501 has a rectangular shape long in the first direction. Moreover, the short portion 503 has a rectangular shape long in the second direction. The long portion 501 extends in the first orientation from the end portion of the second part 303 of the first radiation element 30, wherein the end portion of the second part 303 is oriented in the first orientation of the first direction. The short portion 503 extends forward from an end portion of the long portion 501, wherein the end portion of the long portion 501 is oriented in the first orientation of the first direction. However, the present invention is not limited thereto. The second radiation element 50 may be formed of only the long portion 501. However, the short portion 503 can elongate an electrical length of the second radiation element 50 without increasing a size of the second radiation element 50 in the first direction.

As shown in FIG. 2, the grounding terminal 60 has a rectangular shape long in the second direction. The grounding terminal 60 extends forward from a front edge of the second slot edge portion 203. In detail, the grounding terminal 60 extends forward from a front edge of the end portion 2031 of the second slot edge portion 203. An edge of the grounding terminal 60, which is oriented in the first orientation of the first direction, is arranged on a straight line with an edge of the second slot edge portion 203, which is oriented in the first orientation of the first direction. However, the present invention is not limited thereto. The shape, the size and the position of the grounding terminal 60 may be freely set according to intended properties.

The grounding terminal 60 is connected to a host conductor (not shown) when used. The host conductor may be a device case (not shown) which accommodates the multiband antenna 10 or a ground pattern of a circuit board (not shown) on which the multiband antenna 10 is mounted. By using the host conductor, downsizing of the multiband antenna 10 can be achieved.

As shown in FIGS. 1 and 2, the conductive main portion 20 is provided with feeding points 211 and 213. In the present embodiment, the feeding points 211 and 213 are located nearer to the coupling portion 205 than to the open portion 24 in the first direction. The feeding points 211 and 213 are located so that they sandwich the slot 22 in the second direction. By supplying high-frequency power between the feeding points 211 and 213, the multiband antenna 10 is operated as an antenna. For supplying the high-frequency power between the feeding points 211 and 213, a coaxial cable (not shown) may be used, for example.

The multiband antenna 10 has a plurality of operating frequencies. In detail, the multiband antenna 10 has three operating frequencies depending on the conductive main portion 20, the first radiation element 30 and the second radiation element 50, respectively. An electrical length of each of the first radiation element 30 and the second radiation element 50 is equal to a quarter of a wavelength of the operating frequency corresponding thereto. The electrical length of the first radiation element 30 and the electrical length of the second radiation element 50 are different from each other. For example, the electrical length of the second radiation element 50 is longer than the electrical length of the first radiation element 30. With this structure, the second radiation element 50 can have the operating frequency lower than that of the first radiation element 30. The operating frequency depending on the conductive main portion 20 is lower than that of only the conductive main portion 20 because of influence of each of the first radiation element 30, the second radiation element 50 and the grounding terminal 60. Accordingly, when trying to obtain a specific operating frequency, each of the first radiation element 30, the second radiation element 50 and the grounding terminal 60 helps to downsize the multiband antenna 10. The additional element 40 adjusts the impedance of the multiband antenna 10 and lowers the operating frequencies of the multiband antenna 10 or helps to downsize the multiband antenna 10.

Although the description about one embodiment of the present invention is made above, the multiband antenna 10 may be modified as follows. In each of modifications mentioned below, the same or the similar components same as or similar to those of the multiband antenna 10 are represented by the same or the similar reference signs and the description thereabout is omitted.

[First Modification]

Figure 3:
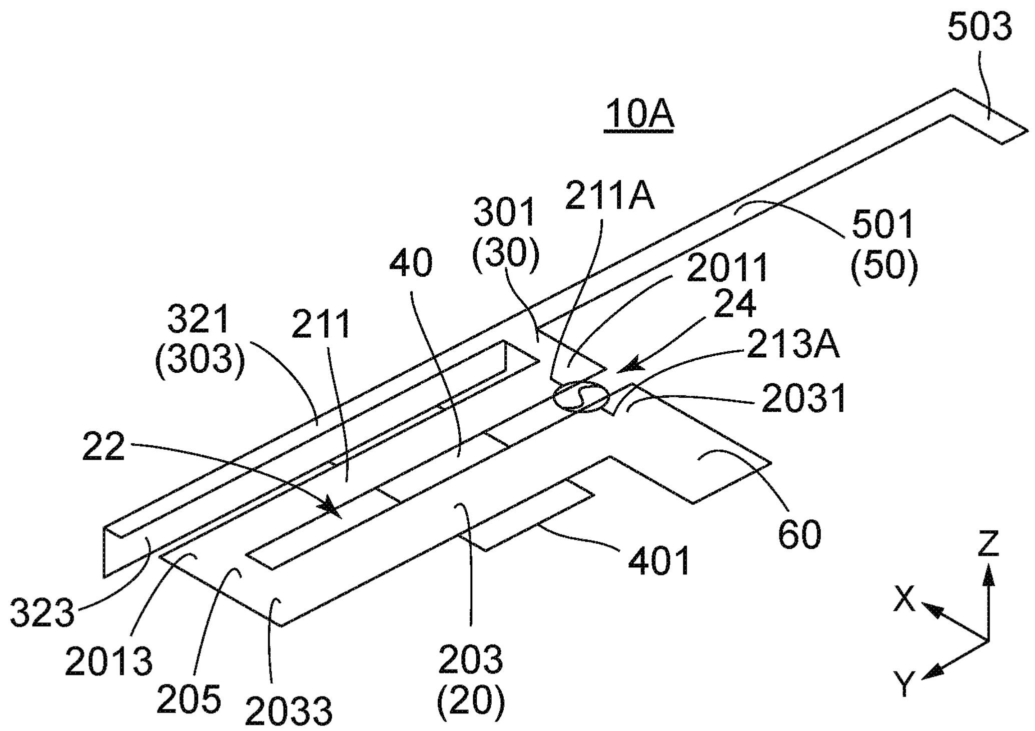
FIG. 3 is a perspective view showing a first modification of the multiband antenna of FIG. 1.

Referring to FIG. 3, a multiband antenna 10A of a first modification is different from the multiband antenna 10 (see FIG. 1) of the aforementioned embodiment in that positions of feeding points 211A and 213A are different from those of the feeding points 211 and 213 (see FIG. 1).

As shown in FIG. 3, the positions of the feeding points 211A and 213A are nearer to an open portion 24 than to a coupling portion 205 in the first direction. Thus, in the present invention, the positions of the feeding points 211 and 213 or 211A and 213A may be changed according to intended antenna properties.

[Second Modification]

Figure 4:
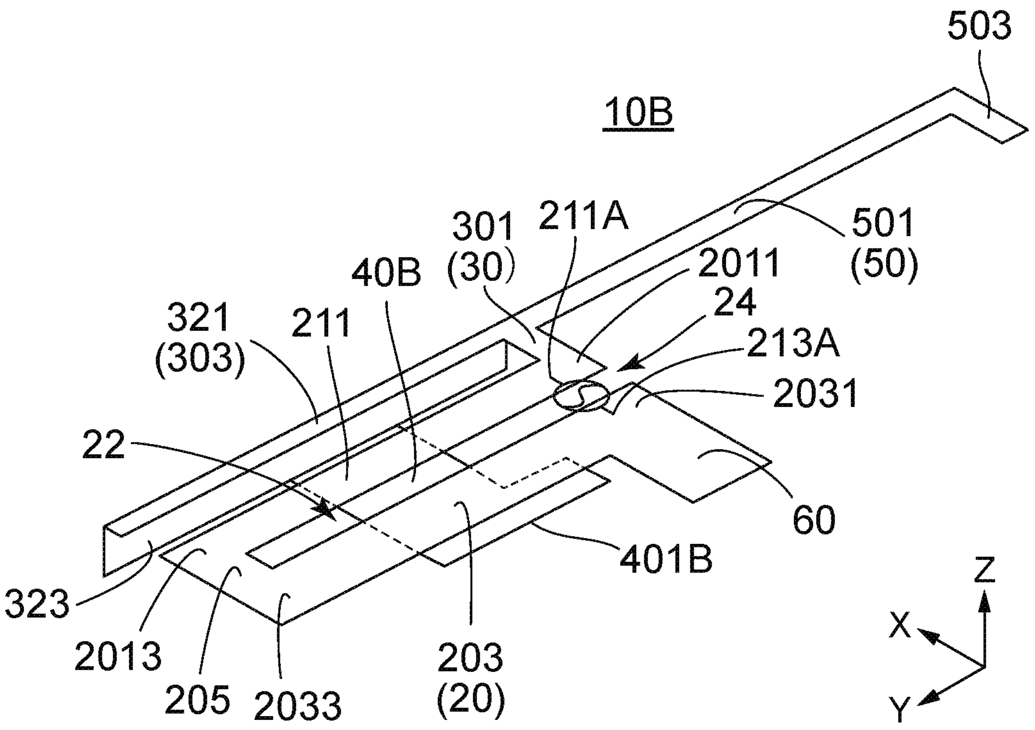
FIG. 4 is a perspective view showing a second modification of the multiband antenna of FIG. 1.

Referring to FIG. 4, a multiband antenna 10B of a second modification is different from the multiband antenna 10A (see FIG. 3) of the first modification in that a shape of an additional element 40B is different from that of the additional element 40 (see FIG. 3).

As shown in FIG. 4, the additional element 40B has an L-shape when viewed along the third direction. A size of a front edge 401B of the additional element 40B is larger than that of the front edge 401 of the additional element 40 in the first direction. With this structure, a capacitance between the additional element 40B and a second slot edge portion 203 can be larger than that between the additional element 40 and the second slot edge portion 203. A larger capacitance can achieve a lower operating frequency and downsize the multiband antenna 10B.

[Third Modification]

Figure 5:
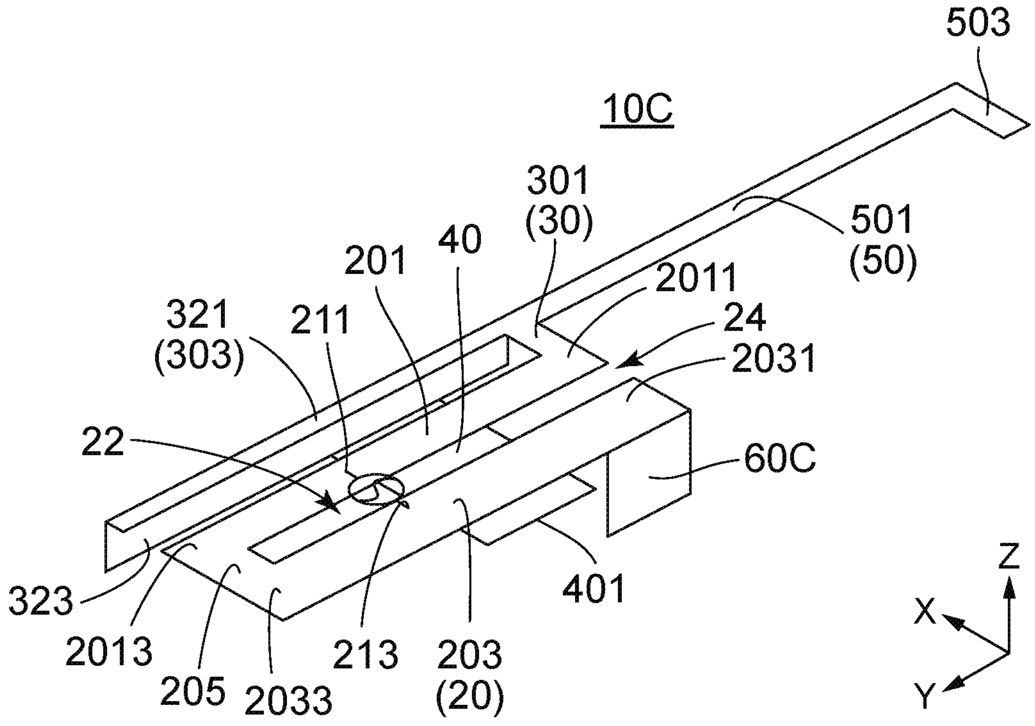
FIG. 5 is a perspective view showing a third modification of the multiband antenna of FIG. 1.

Referring to FIG. 5, a multiband antenna 10C of a third modification is different from the multiband antenna 10 (see FIG. 1) of the aforementioned embodiment in that it has a grounding terminal 60C which has a part extending in a direction intersecting with the specific plane or the X-Y plane.

As shown in FIG. 5, in the present modification, the grounding terminal 60C has a rectangular flat plate-like shape, and the whole thereof extends downward from a front edge of a second slot edge portion 203. However, the present invention is not limited thereto. The grounding terminal 60C may extend forward from the front edge of the second slot edge portion 203 and then extend the direction intersecting with the specific plane. In that case, the part extending in the direction intersecting with the specific plane may be on a plane perpendicular to the first direction or on a plane perpendicular to the second direction.

[Fourth Modification]

Figure 6:
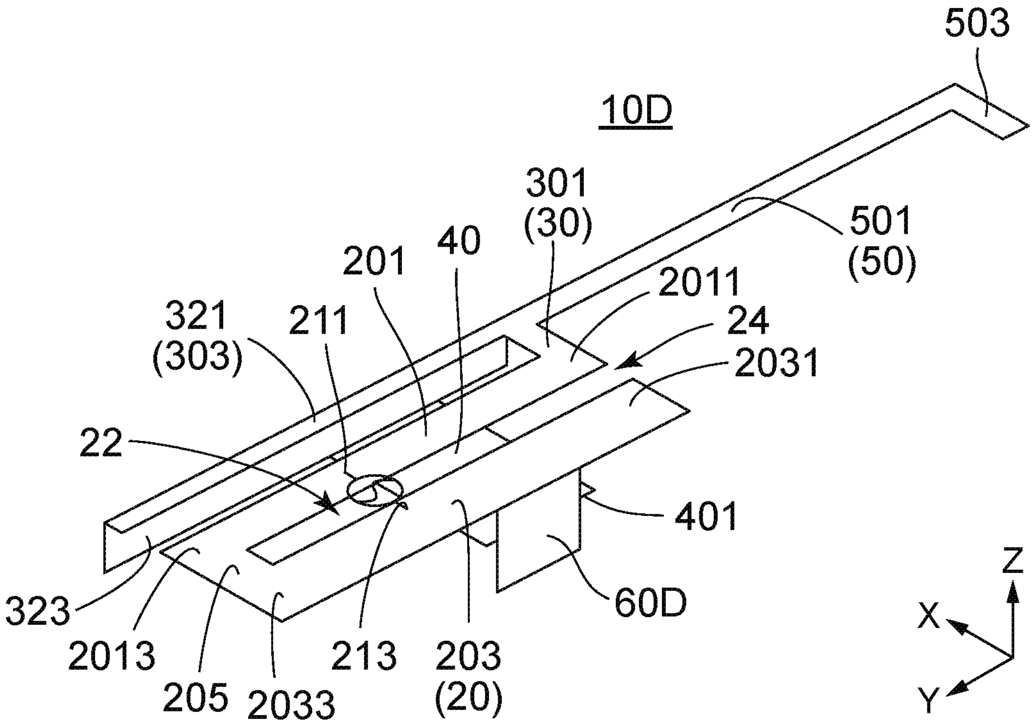
FIG. 6 is a perspective view showing a fourth modification of the multiband antenna of FIG. 1.

Referring to FIG. 6, a multiband antenna 10D of a fourth modification is different from the multiband antenna 10C (see FIG. 5) of the third modification in that a position of a grounding terminal 60D is different from that of the grounding terminal 60C (see FIG. 5).

As shown in FIG. 6, in the present modification, the grounding terminal 60D is positioned apart from both ends of a second slot edge portion 203 in the first direction. Moreover, the grounding terminal 60D is nearer to an open portion 24 than to a coupling portion 205 in the first direction. Thus, in the present invention, the position of the grounding terminal 60, 60C or 60D may be changed according to intended antenna properties.

[Fifth Modification]

Figure 7:
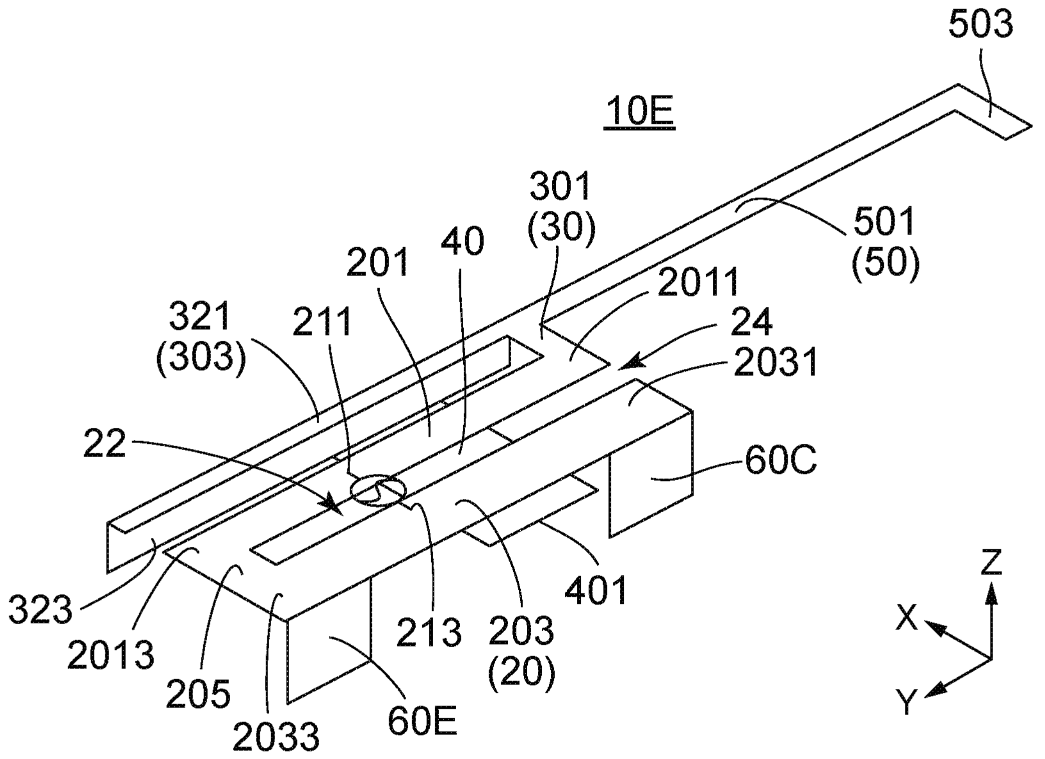
FIG. 7 is a perspective view showing a fifth modification of the multiband antenna of FIG. 1.

Referring to FIG. 7, a multiband antenna 10E of a fifth modification is different from the multiband antenna 10C (see FIG. 5) of the third modification in that it has an additional grounding terminal 60E in addition to a grounding terminal 60C.

As shown in FIG. 7, in the present modification, the additional grounding terminal 60E extends downward from a front edge of an end portion 2033 of a second slot edge portion 203. The additional grounding terminal 60E helps to improve reliability of the multiband antenna 10E. Thus, the multiband antenna of the present invention can be provided with any number of grounding terminals.

[Sixth Modification]

Figure 8:
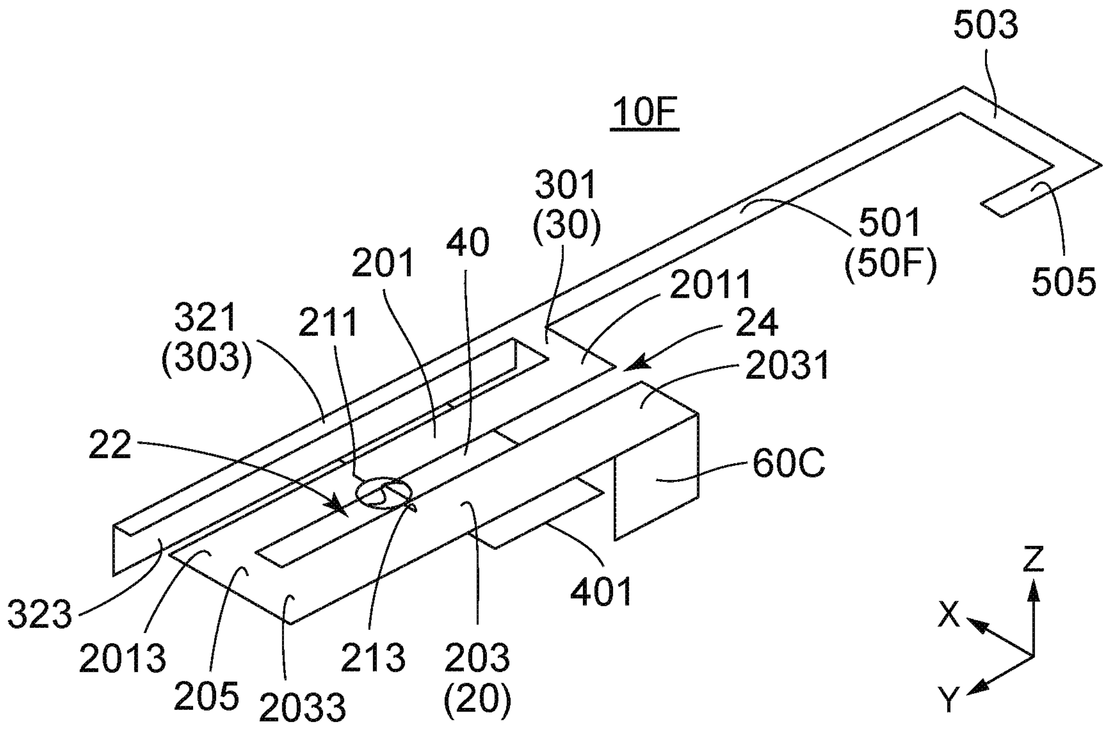
FIG. 8 is a perspective view showing a sixth modification of the multiband antenna of FIG. 1.

Referring to FIG. 8, a multiband antenna 10F of a sixth modification is different from the multiband antenna 10C (see FIG. 5) of the third modification in that a shape of a second radiation element 50F is different from that of the second radiation element 50 (see FIG. 5). In detail, in the multiband antenna 10F, the second radiation element 50F has an extension portion 505 in addition to a long portion 501 and a short portion 503.

As shown in FIG. 8, the extension portion 505 extends from a front-end portion of the short portion 503 in the second orientation. The extension portion 505 can lengthen an electrical length of the second radiation element 50F without increasing a size of the second radiation element 50F in the first direction. Thus, in the present invention, a shape of the second radiation element 50 or 50F may be changed according to intended antenna properties.

[Seventh Modification]

Figure 9:
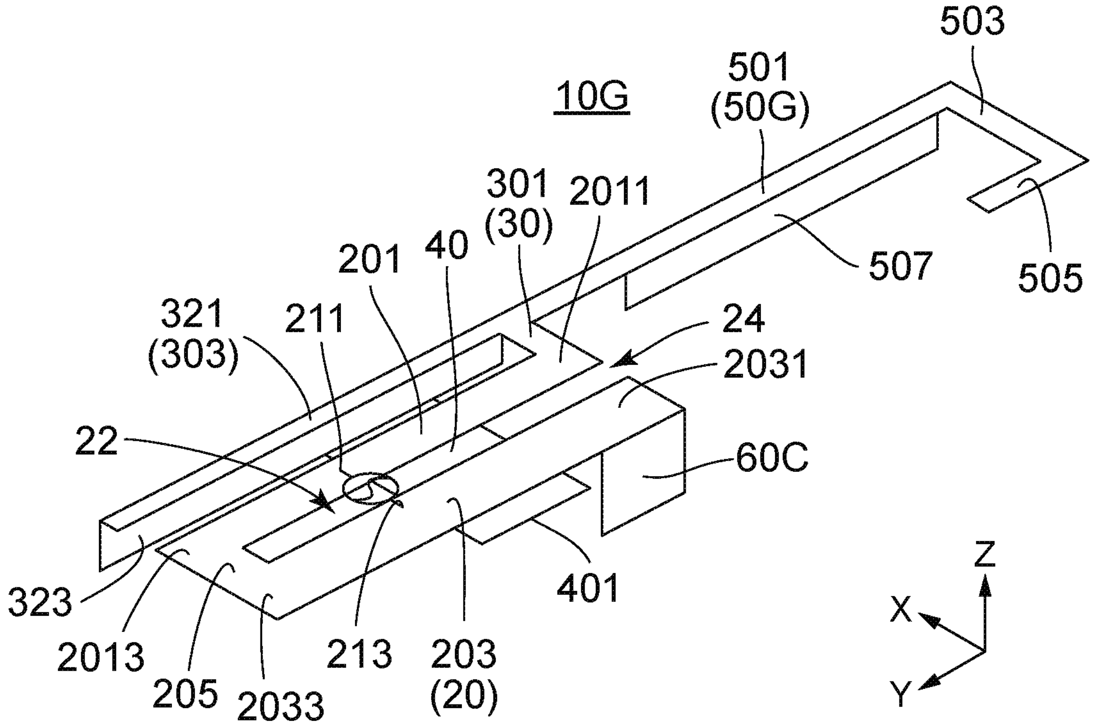
FIG. 9 is a perspective view showing a seventh modification of the multiband antenna of FIG. 1.

Referring to FIG. 9, a multiband antenna 10G of a seventh modification is different from the multiband antenna 10F (see FIG. 8) of the sixth modification in that a shape of a second radiation element 50G is different from that of the second radiation element 50F (see FIG. 8). In detail, in the multiband antenna 10G, the second radiation element 50G has a vertical portion 507 in addition to the structure of the second radiation element 50F.

As shown in FIG. 9, the vertical portion 507 extends downward from a rear edge of a long portion 501. In the first direction, a size of the vertical portion 507 is smaller than that of the long portion 501. The vertical portion 507 helps to improve strength and radiation properties of the second radiation element 50G. Thus, in the present invention, a shape of the second radiation element 50, 50F or 50G may be changed according to intended antenna properties.

[Eighth Modification]

Figure 10:
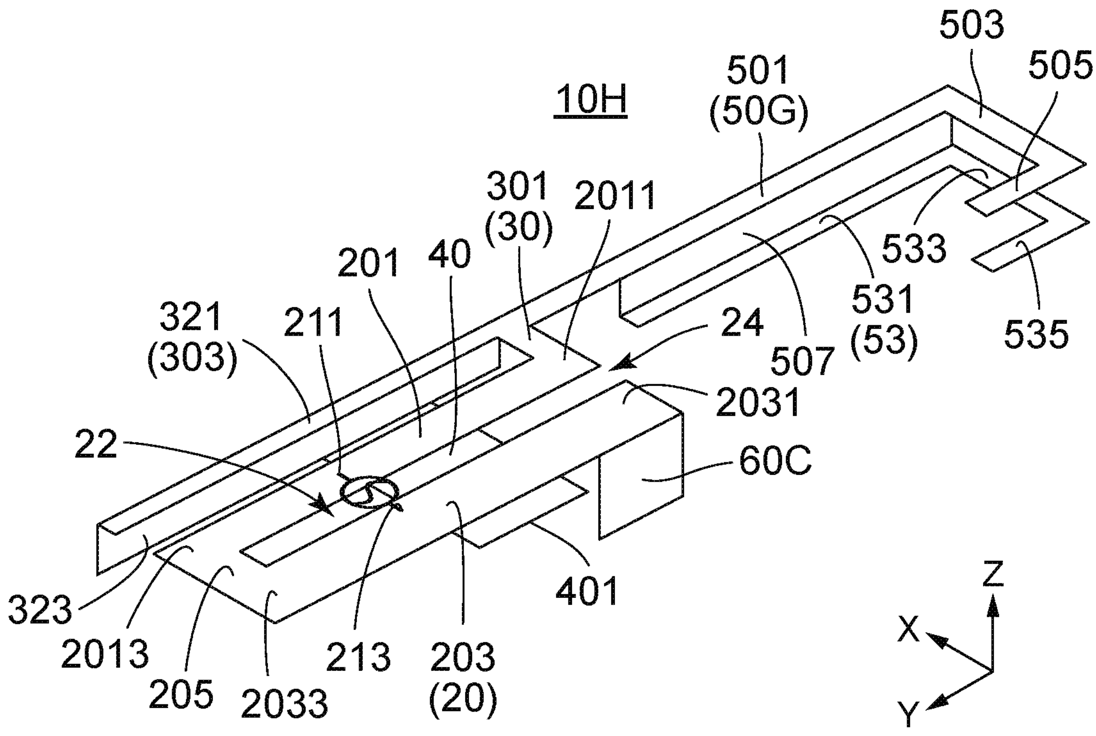
FIG. 10 is a perspective view showing an eighth modification of the multiband antenna of FIG. 1.

Referring to FIG. 10, a multiband antenna 10H of an eighth modification is different from the multiband antenna 10G (see FIG. 9) of the seventh modification in that it is provided with a third radiation element 53.

As shown in FIG. 10, the third radiation element 53 has an additional long portion 531, an additional short portion 533 and an additional extension portion 535. The third radiation element 53 is formed so that it is substantially same as a second radiation element 50G. The additional long portion 531 is coupled with a lower edge of a vertical portion 507. When viewed along the third direction, the third radiation element 53 overlaps with the second radiation element 50G. Thus, in the multiband antenna of the present invention, the number of radiation elements or passive antennas, i.e., the number of operating frequencies or an operating frequency band can be freely set.

[Ninth Modification]

Figure 11:
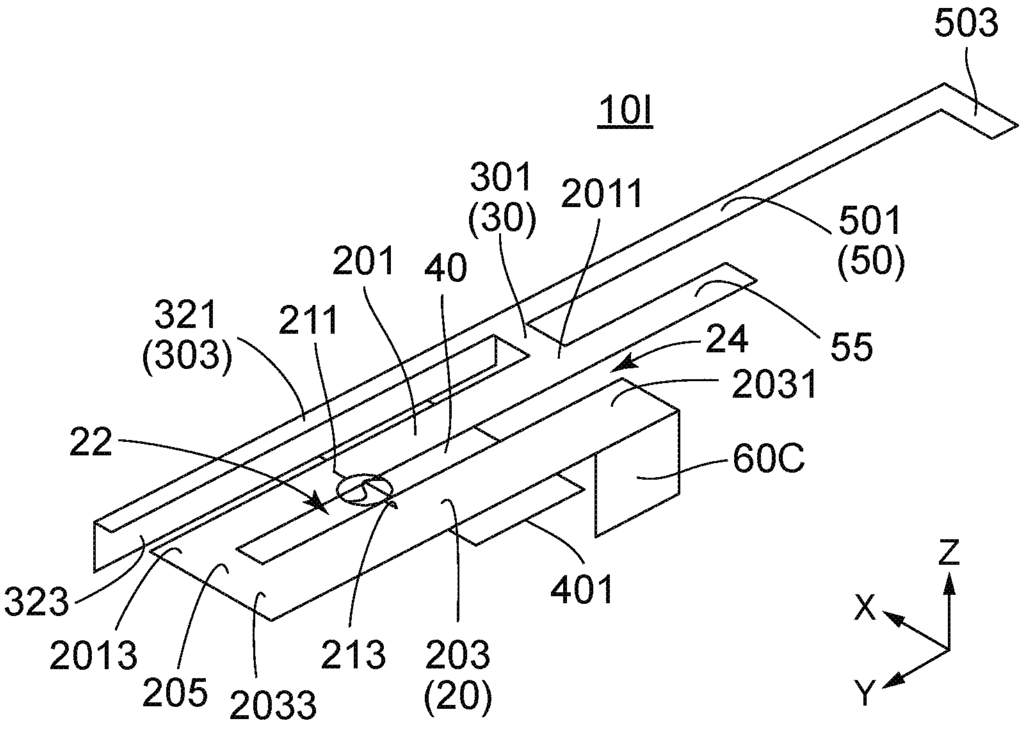
FIG. 11 is a perspective view showing a ninth modification of the multiband antenna of FIG. 1.

Referring to FIG. 11, a multiband antenna 10I of a ninth modification is different from the multiband antenna 10C (see FIG. 5) of the third modification in that it is provided with a fourth radiation element 55.

As shown in FIG. 11, the fourth radiation element 55 has a rectangular shape long in the first direction. The fourth radiation element 55 extends from an end portion 2011 of a first slot edge portion 201 in the first orientation. In the first direction, a size of the fourth radiation element 55 is equal to or less than half of a size of a long portion 501 of a second radiation element 50. However, the present invention is not limited thereto. The shape and the size of the fourth radiation element 55 may be freely set according to intended antenna properties.

[Tenth Modification]

Figure 12:
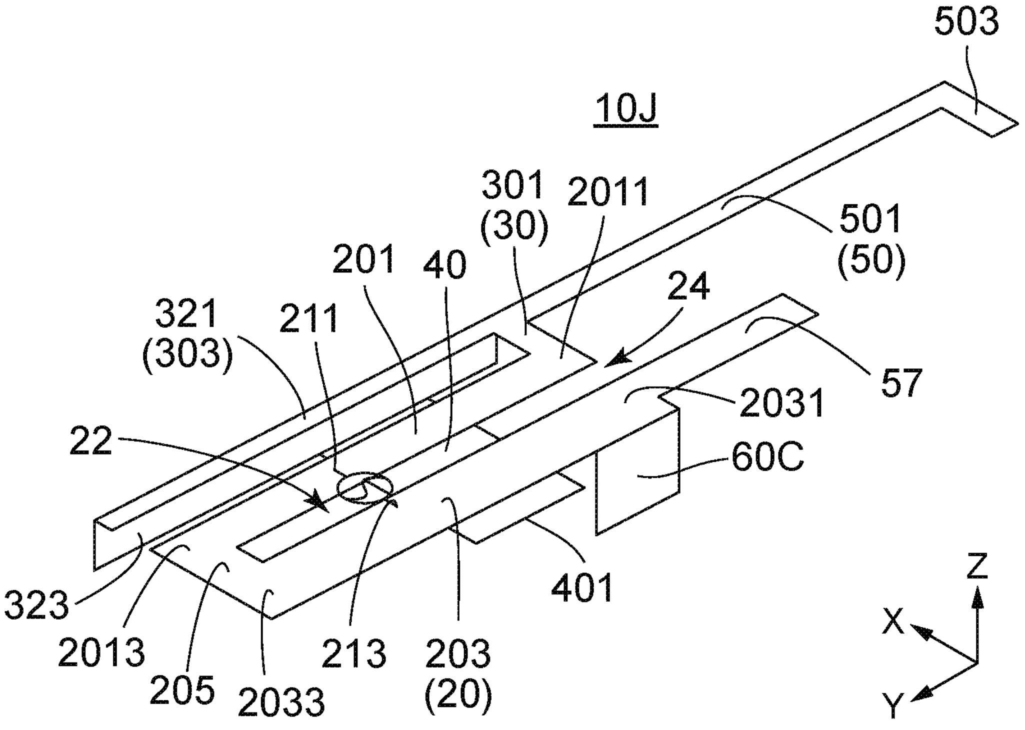
FIG. 12 is a perspective view showing a tenth modification of the multiband antenna of FIG. 1.

Referring to FIG. 12, a multiband antenna 10J of a tenth modification is different from the multiband antenna 10C (see FIG. 5) of the third modification in that it is provided with a fifth radiation element 57.

As shown in FIG. 12, the fifth radiation element 57 has a rectangular shape long in the first direction. The fifth radiation element 57 extends from an end portion 2031 of a second slot edge portion 203 in the first orientation. In the first direction, a size of the fifth radiation element 57 is equal to or less than half of a size of a long portion 501 of a second radiation element 50. However, the present invention is not limited thereto. The shape and the size of the fifth radiation element 57 may be freely set according to intended antenna properties.

[Eleventh Modification]

Figure 13:
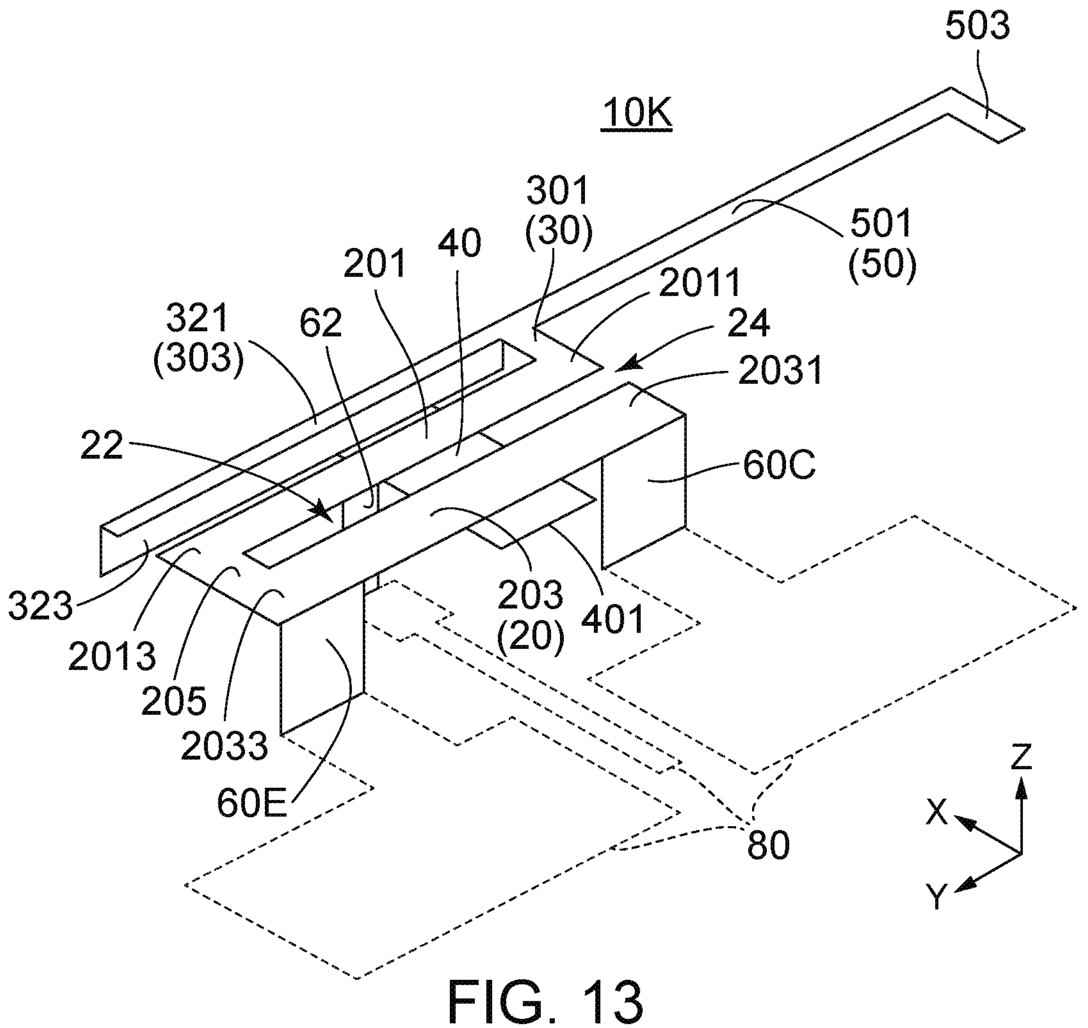
FIG. 13 is a perspective view showing an eleventh modification of the multiband antenna of FIG. 1. Conductive patterns formed on an object are depicted by broken lines.

Referring to FIG. 13, a multiband antenna 10K of an eleventh modification is different from the multiband antenna 10E (see FIG. 7) of the fifth modification in that it is provided with a feeding terminal 62.

As shown in FIG. 13, the feeding terminal 62 has a part extending in a direction intersecting with the specific plane. In the present modification, the feeding terminal 62 has a rectangular flat plate-like shape, and the whole thereof extends downward from a front edge of a first slot edge portion 201. However, the present invention is not limited thereto. The feeding terminal 62 may extend forward from the front edge of the first slot edge portion 201 and then extend the direction intersecting with the specific plane. In that case, the part extending in the direction intersecting with the specific plane may be on a plane perpendicular to the first direction or on a plane perpendicular to the second direction.

As understood from FIG. 13, in the third direction, a size of the feeding terminal 62 is equal to that of a grounding terminal 60C and to that of an additional grounding terminal 60E. With this structure, the multiband antenna 10K can be surface mounted on an object (not shown), such as a circuit board. For example, if conductive patterns 80 corresponding to the feeding terminal 62, the grounding terminal 60C and the additional grounding terminal 60E, respectively, are formed on the object, the feeding terminal 62, the grounding terminal 60C and the additional grounding terminal 60E can be connected to the conductive patterns 80 corresponding to them, respectively.

[Twelfth Modification]

Figure 14:
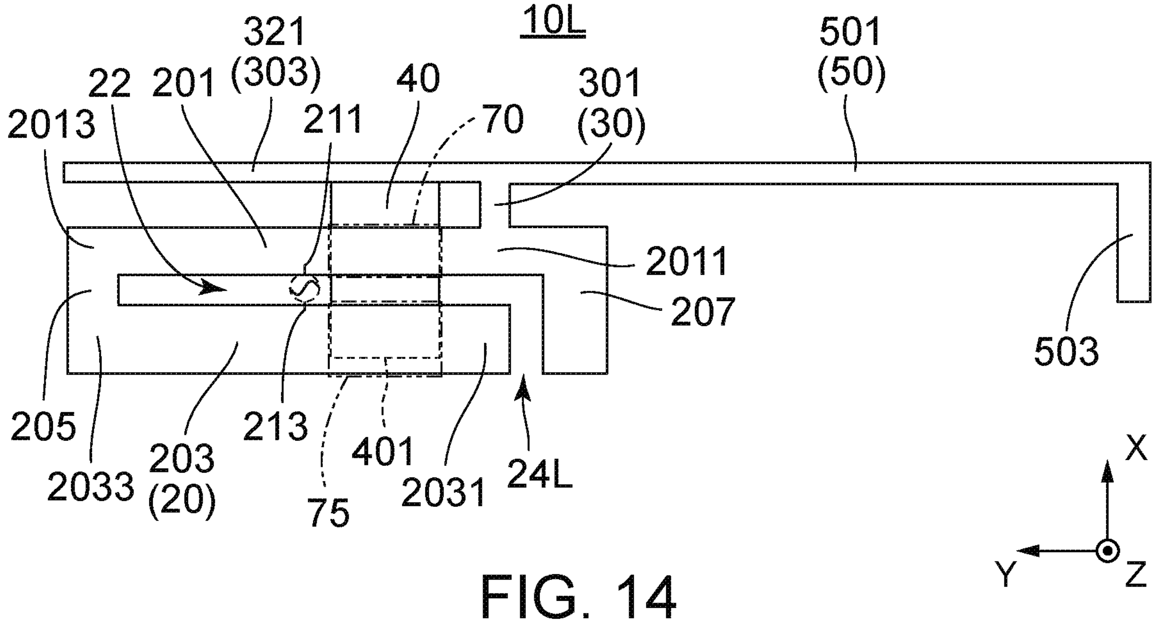
FIG. 14 is a top view showing a twelfth modification of the multiband antenna of FIG. 1. An additional element is depicted by broken lines in part. Each of a first specific area and a second specific area is depicted by a chain double-dushed line.

Referring to FIG. 14, a multiband antenna 10L of a twelfth modification is different from the multiband antenna 10 (see FIG. 2) of the aforementioned embodiment in that it further has a first extension slot edge portion 207.

As shown in FIG. 14, the first extension slot edge portion 207 has an L-shape when viewed along the third direction. In detail, the first extension slot edge portion 207 extends from an end portion 2011 of a first slot edge portion 201 in the first orientation and then extends forward. In the present modification, an open portion 24L is formed at a part of a conductive main portion 20 which is different from the first slot edge portion 201. In detail, the open portion 24L is located between a front edge of a second slot edge portion 203 and a front edge of the first extension slot edge portion 207 and opened forward.

[Thirteenth Modification]

Figure 15:
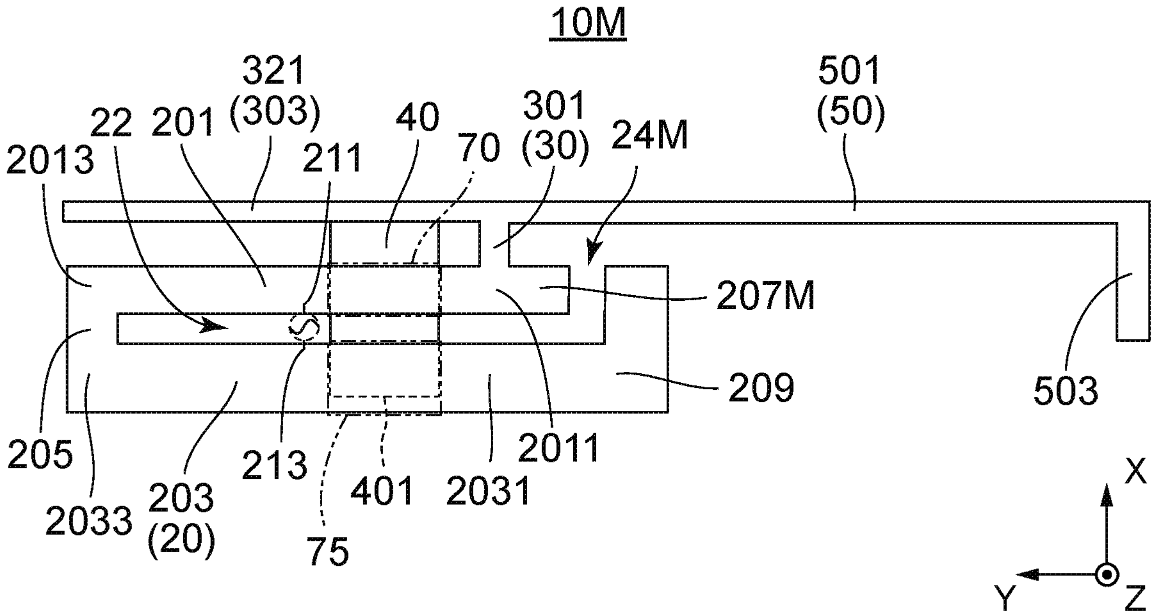
FIG. 15 is a top view showing a thirteenth modification of the multiband antenna of FIG. 1. An additional element is depicted by broken lines in part. Each of a first specific area and a second specific area is depicted by a chain double-dushed line.

Referring to FIG. 15, a multiband antenna 10M of a thirteenth modification is different from the multiband antenna 10 (see FIG. 2) of the aforementioned embodiment in that it further has a first extension slot edge portion 207M and a second extension slot edge portion 209.

As shown in FIG. 15, the first extension slot edge portion 207M has a rectangular shape and extends from an end portion 2011 of a first slot edge portion 201 in the first orientation. Moreover, the second extension slot edge portion 209 has an inverted L-shape when viewed along the third direction. In detail, the second extension slot edge portion 209 extends from an end portion 2031 of a second slot edge portion 203 in the first orientation and then extends rearward. In the present modification, an open portion 24M is formed at a part of a conductive main portion 20 which is different from the first slot edge portion 201. In detail, the open portion 24M is located between a rear edge of the first extension slot edge portion 207M and a rear edge of the second extension slot edge portion 209 and opened rearward.

[Fourteenth Modification]

Figure 16:
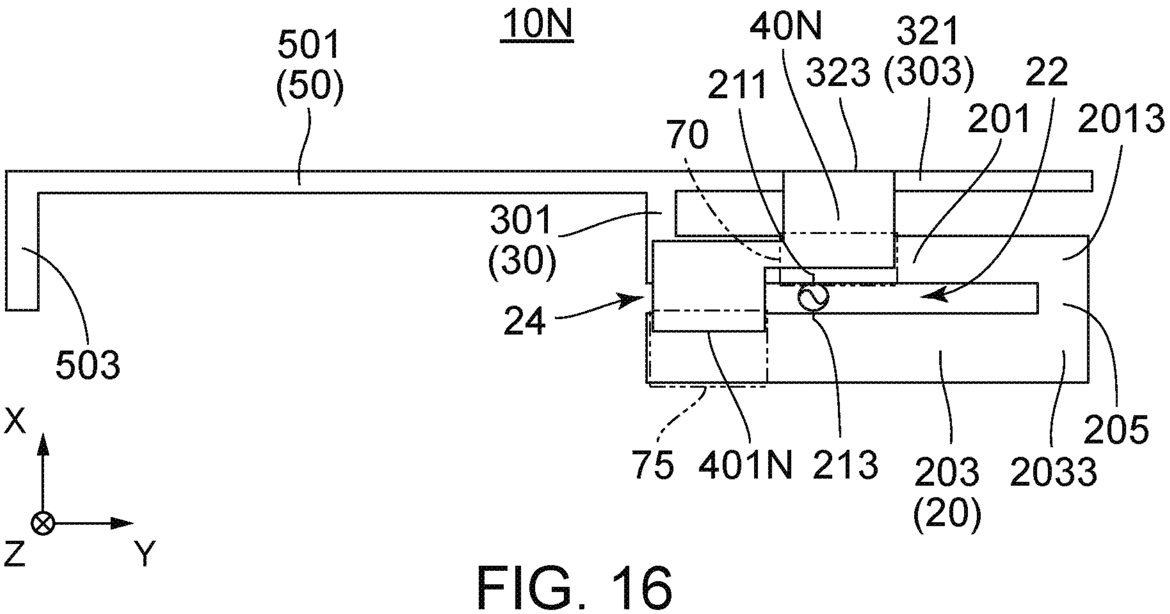
FIG. 16 is a bottom view showing a fourteenth modification of the multiband antenna of FIG. 1. Each of a first specific area and a second specific area is depicted by a chain double-dushed line.
Figure 17:
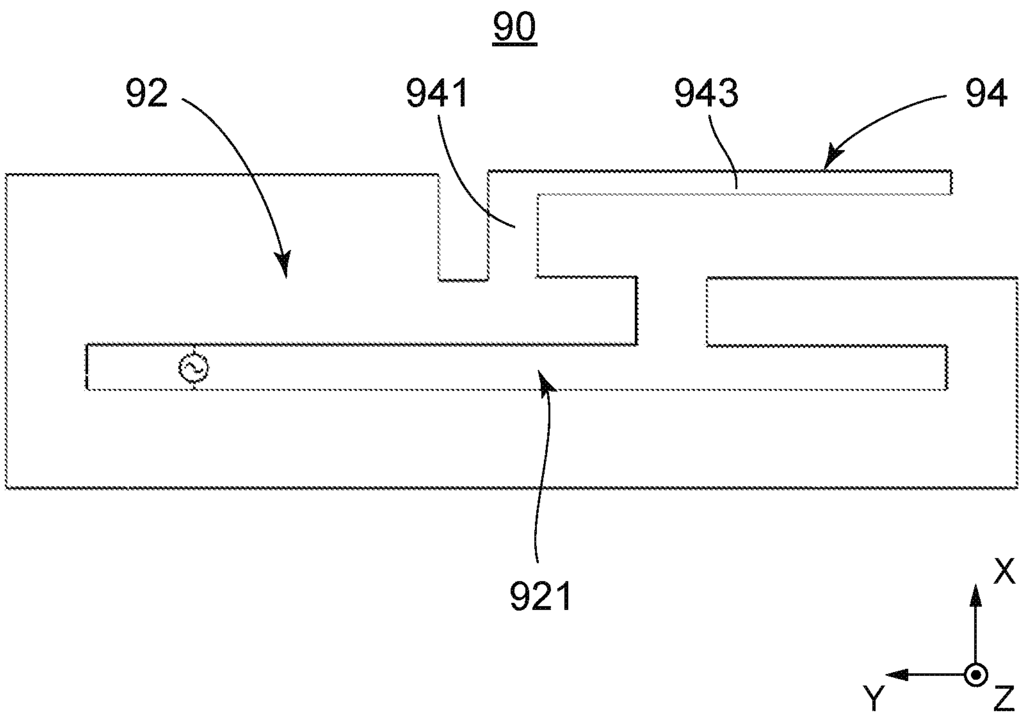
FIG. 17 PRIOR ART
FIG. 17 is a top view showing a multiband antenna disclosed in Patent Document 1.

Referring to FIG. 16, a multiband antenna 10N of a fourteenth modification is different from the multiband antenna 10 (see FIG. 2) of the aforementioned embodiment in that a shape of an additional element 40N is different from that of the additional element 40 (see FIG. 2). However, the additional element 40N of the present modification has in common with the additional element 40 in that it extends toward a second specific area 75 through a first specific area 70.

In detail, as shown in FIG. 16, the additional element 40N of the present modification has a crank shape when viewed along the third direction. In more detail, the additional element 40N of the present modification extends forward from a lower end of a rear portion 323 of a first radiation element 30 and then extends in the first orientation and further extends forward. Additionally, each of the first specific area 70 and the second specific area 75 is an area on a plane which is perpendicular to the third direction and which is positioned apart from the specific plane in the third direction. In addition, the first specific area 70 is an area overlapping with a first slot edge portion 201 in the third direction. Moreover, the second specific area 75 is an area overlapping with a second slot edge portion 203 in the third direction. In the present modification, the additional element 40N is located on a plane where the first specific area 70 and the second specific area 75 are included, and a front edge 401N of the additional element 40N is in the second specific area 75. The additional element 40N forms a capacitance between itself and the second slot edge portion 203 and adjusts an impedance of the multiband antenna 10N, so that it lowers operating frequencies of the multiband antenna 10N or helps to downsize the multiband antenna 10N.

Although the specific explanation about the present invention is made above with reference to concrete embodiments, the present invention is not limited thereto but susceptible of various modifications and alternative forms without departing from the spirit of the invention. For example, the structures of the modifications 1 to 14 may be suitably selected and combined.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A multiband antenna comprising a conductive main portion forming a slot antenna, a radiation element and an additional element, wherein:

the conductive main portion comprises a first slot edge portion and a second slot edge portion;

the conductive main portion is formed with a slot and an open portion;

the slot has a longitudinal direction in a first direction;

each of the first slot edge portion and the second slot edge portion has a longitudinal direction in the first direction;

the first slot edge portion and the second slot edge portion are arranged so that the first slot edge portion and the second slot edge portion sandwich the slot therebetween in a second direction perpendicular to the first direction;

the open portion is formed at a part of the conductive main portion which is different from the first slot edge portion and opens the slot outside of the conductive main portion;

the radiation element has a first part and a second part;

the first part extends from an end portion of the first slot edge portion in the second direction;

the second part extends from an end portion of the first part in the first direction;

the additional element extends from the second part to or toward a second specific area through a first specific area without being brought into contact with the conductive main portion;

the first specific area is an area which overlaps with the first slot edge portion in a third direction perpendicular to both the first direction and the second direction; and the second specific area is an area which overlaps with the second slot edge portion in the third direction.

2. The multiband antenna as recited in claim 1, wherein the additional element extends to the second specific area and overlaps with the second slot edge portion when viewed along the third direction.

3. The multiband antenna as recited in claim 2, wherein:

the multiband antenna further comprises an additional radiation element;

the first part extends, in the second direction, from the end portion of the first slot edge portion which is directed in a first orientation of the first direction;

the second part extends from the end portion of the first part in a second orientation opposite to the first orientation; and the additional radiation element extends from the radiation element in the first orientation.

4. The multiband antenna as recited in claim 3, wherein the additional radiation element extends from the second part of the radiation element.

5. The multiband antenna as recited in claim 1, wherein:

the multiband antenna further comprises a grounding terminal; and the grounding terminal extends from the second slot edge portion.

6. The multiband antenna as recited in claim 5, wherein:

the grounding terminal has a part extending in a direction intersecting with a specific plane which is defined by the first direction and the second direction;

the multiband antenna further comprises a feeding terminal; and the feeding terminal is a part extending in a direction intersecting with the specific plane.

* * * * *